United States Patent [19]
Morel

[11] 3,777,666
[45] Dec. 11, 1973

[54] SAFETY DEVICE FOR A GYRATORY ROCKET MISSILE

[75] Inventor: René Morel, Geneva, Switzerland
[73] Assignee: Mefina S.A., Fribourg, Switzerland
[22] Filed: Oct. 28, 1971
[21] Appl. No.: 193,256

[30] Foreign Application Priority Data
Nov. 3, 1970 Switzerland.................. 16257/70

[52] U.S. Cl. ............................. 102/80, 102/84
[51] Int. Cl. ................................. F42c 15/26
[58] Field of Search ............... 102/70, 79, 80, 84

[56] References Cited
UNITED STATES PATENTS

| | | | |
|---|---|---|---|
| 3,465,676 | 9/1969 | Simmen | 102/80 |
| 3,450,049 | 6/1969 | Dare | 102/80 |
| 2,446,545 | 8/1948 | McCaslin | 102/80 |
| 2,789,507 | 4/1957 | Apotheloz | 102/80 |

Primary Examiner—Samuel W. Engle
Attorney—Emory L. Groff et al.

[57] ABSTRACT

A safety device for a gyratory rocket missile of the type with a primer support centrifugally pivotable from a safe to an armed position and centrifugally releasable means for securing the support in the safe position, comprises an axially slidable pin urged by a spring to a position locking the securing means in support-securing positon. The two ends of a resilient open loop releasably engage a groove in the pin to hold it in the locking position and, when the pin moves due to an axial acceleration upon firing the missile so as to free the securing means, the ends of the loop come to bear against a shoulder of the pin to prevent return thereof. Once the support regulated by a delay mechanism reaches the armed position, a finger slidably mounted in an outwardly opening radial housing in the primer support moves out of its housing to lock the support in position.

1 Claim, 3 Drawing Figures

PATENTED DEC 11 1973 3,777,666
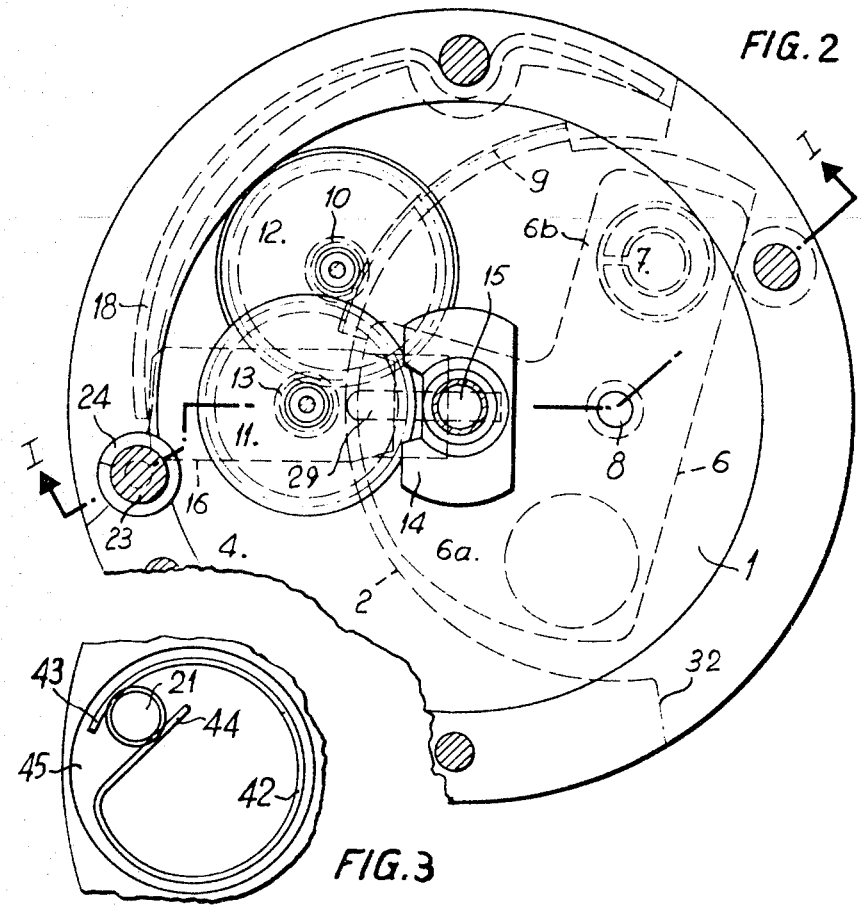
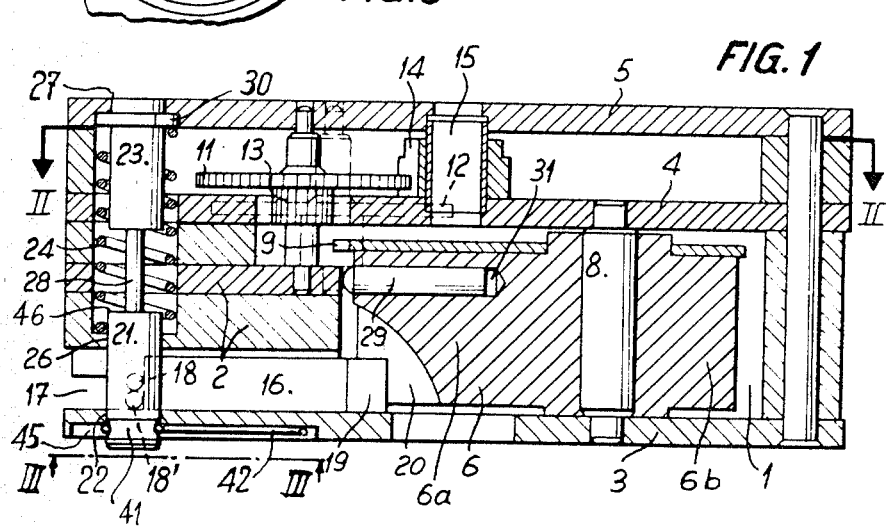
INVENTOR
RENÉ MOREL
BY Emory L. Groff Jr.
ATTORNEY

SAFETY DEVICE FOR A GYRATORY ROCKET MISSILE

The invention relates to a safety device for a gyratory rocket missile.

Rocket missiles provided with a safety device comprising a primer support movable between a safe position and an armed position under the action of centrifugal force, and means for securing this support in the safe position, sensitive to centrifugual force to free the primer support, are already known. However, in the case of a fall, for example during transport, it can happen that a missile rolls and hence develops a sufficient centrifugal force to cause withdrawal of the said securing device.

The object of the present invention is to remedy this drawback.

According to the invention, a safety device for a gyratory rocket missile comprises a primer support member movable under the action of centrifugal force upon gyration of the missile between a safe position and an armed position; means for releasably securing the support in the safe position, said securing means being movable under the action of centrifugal force upon gyration of the missile from a support-securing position to a position in which the support is freed; and means for releasably locking the securing means in the support-securing position, said locking means comprising a retaining member slidably mounted parallel to the axis of the missile between a first position in which it locks the securing means in the support-securing position and a second position in which the securing means is freed, and a spring opposing movement of the locking means from the first position to the second position upon axial acceleration of the missile.

The accompanying drawings show, schematically and by way of example, a preferred embodiment of safety device according to the invention. In the drawings:

FIG. 1 is a cross-section taken along line I—I of FIG. 2;

FIG. 2 is a schematic plan view, partially in cross-section along line II—II of FIG. 1; and FIG. 3 is an bottom plan view of a detail as seen along line III—III of FIG. 1.

As shown in the drawings, the safety device comprises a central housing 1 defined between transversal plates 2 to 5. Between plates 3 and 4, a support 6 for a pyrotechnical primer 7 is pivotally mounted about a shaft 8 parallel to the axis of the rocket missile (not shown) in which the safety device is fitted. The support 6 has a toothed sector 9 by which it meshes with a pinion 10 of a toothed wheel 12 meshing in turn with a pinion 13 integral with an escapement wheel 11 movement of which is regularized by a balance 14 oscillably mounted about a shaft 15. The pivots of the arbors of the escapement wheel 11 and the toothed wheel 12 are mounted in bearings provided in the plates 2 and 5, while the pivots of shaft 15 of the balance 14 are mounted in bearings provided in the plates 4 and 5. Shaft 15 is tubular to allow for passage of either a firing pin (not shown) or a flame from a primer located forwardly in relation to the direction of firing of the missile.

As long as the pyrotechnical primer is not brought into alignment with the channel formed by the tubular shaft 15, detonation cannot take place. The primer 7 support 6 must thus be held in its safe position, as shown in FIG. 2, as long as the missile, which is designed for use with a rifled bore muzzle, has not been fired. For this purpose, a device for securing the primer support 6 in its safe position and a device for locking this securing device are provided.

The securing device is a conventional device comprising a slide piece 16 capable of being radially moved in a slideway 17 provided between the plates 2 and 3. Two independently acting springs 18 and 18' act against the slide piece 16 to hold it in an advanced or operative support-securing position in which its inner end 19 engages in a notch 20 of the primer support 6, as shown. This securing device is sensitive to centrifugal force and is constructed so as to free the support 6 as soon as rotation of the missile during the trajectory produces a centrifugal force sufficient to push the slide piece 16 radially outwardly against the action of the springs 18 and 18'. It should be noted that the use of two springs for this purpose enhances reliability of the device, since it is extremely unlikely that the two springs could simultaneously become defective.

The device for locking the above-described securing device comprises a retaining member formed by a pin 21 including an upwardly extending rod 28 terminating a cylinder 23 having a flange 30. This flange forms a bearing surface for a return spring 24 which holds the retaining member in the position shown in the drawings, in which position it locks the slide piece 16 in its advanced position.

The lower end of the pin 21 has a recess in the form of a groove 41 in which is engaged stop means comprising an elastic element formed by an open loop 42 of resilient steel wire housed in a recess 45 of the lower plate 3. The two ends 43 and 44 of this loop 42 are located on opposite sides of the retaining member and, in the position shown, transversely bear against and removably engage in the groove 41 of pin 21 to releasably hold the retaining member in position.

At rest, the free end of pin 21 passes through a bore 22 in the plate 3 and the other end of pin 21 adjacent and fixed to the rod 28 terminates with a shoulder 46, said latter end passing through a bore 26 in the plate 2. In this rest position, the pin 21 forms a locking stop member in the path that the slide piece 16 must cover under the effect of centrifugal force to disengage from the notch of the primer support 6.

The cylinder 23 is partially engaged by its free end in a bore 27 of the plate 5 and the flange 30 of the cylinder bears against the lower edge of said bore. The return spring 24, coaxially located about the cylinder 23, is supported between the flange 30 and about the upper edge of the bore 26 in the plate 2 so as to hold the pin 21 in its rest or locking position.

When the shot is fired, the axial acceleration is sufficient to cause displacement of the pin 21 until its shoulder 46 is located below the ends 43 and 44 of the loop 42. These ends elastically grip against the rod 28 and thus prevent return of the retaining member 21, under the action of the spring 24, to its initial position. Hence, the retaining member is held in a position enabling radial outward movement of the slide piece 16 under the action of centrifugal force. The slide piece 16 can thus free the primer support 6 as soon as the speed of rotation of the projectile reaches a certain value, even if the axial acceleration has dropped to a value which is less than that which was required to displace the retaining member against the action of the spring 24.

Because the part 6a of the support 6 is heavier than its part 6b carrying the primer 7, once freed the support 6 pivots abouts its shaft 8 in the counterclock-wise direction, looking at FIG. 2. However, this pivotal movement is slowed by the timer mechanism 10–14 in a known manner, the toothed sector 9 of the support 6 meshing with the pinion of the toothed wheel 12 to limit the rate of movement of the support 6 to the speed permitted by the escapement device 11, 14.

It is thus possible to delay the action of movement of the primer support 6 from the same position into the armed position, in which the primer 7 is located under the channel formed by the tubular shaft 15 of balance 14, until the missile has covered a part of its trajectory. This avoids any risk of premature detonation, for example if the missile should hit an object located in the immediate neighbourhood of the muzzle.

Once the support 6 is located in the armed position, it is held in this position by a slidable finger 29 engaged at rest in an outwardly opening radial housing 31 in the support 6 and normally prevented from moving out by bearing against a side wall of the plate 2. When the support 6 reaches the armed position, the finger 29 no longer faces the side wall of plate 2 and, under the action of the centrifugal force produced by rotation of the missile, moves radially outwardly so that its outer end comes into place behind a shoulder 32 of the plate 2.

Numerous modifications of details can be made to the described embodiment of safety device. The springs 18 and 18' could, for example, be eliminated in a simplified type of missile. The means for holding the retaining member in its "unlocking" position could be formed by elements other than a loop 42, for example known types of pawl or notch devices.

I claim:

1. In a safety device for a gyratory rocket missile, said device comprising a primer support member movable under the action of centrifugal force upon gyration of the missile between a safe position and an armed position, means for releasably securing the support in the safe position, said securing means being movable under the action of centrifugal force upon gyration of the missile from a support-securing position to a position in which the support is freed, the improvement comprising means for releasably locking the securing means in the support-securing position, said locking means comprising a retaining member slidably mounted parallel to the axis of the missile between a first position in which it locks the securing means in the support-securing position and a second position in which the securing means is freed, a spring opposing movement of the locking means from the first position to the second position upon axial acceleration of the missile, stop means for holding said retaining member in the second position, said stop means comprising an elastic element bearing transversely against the retaining member, said elastic element being removably engaged in a recess in the retaining member when the retaining member is in the first position, said elastic element comprising an open two-ended loop of resilient wire, the two ends of said loop being disposed on opposite sides of the retaining member, said retaining member comprising a cylindrical pin having a peripheral groove forming said recess, and a rod of lesser diameter than said pin extending from an end of said pin and forming a shoulder therewith, said elastic element engaging against said shoulder when the retaining member is in the second position.

* * * * *